United States Patent [19]
Rasky et al.

[11] Patent Number: 5,545,273
[45] Date of Patent: Aug. 13, 1996

[54] HYBRID FLEXIBLE AND RIGID CERAMIC INSULATION

[75] Inventors: Daniel J. Rasky, Palo Alto; Demetrius A. Kourtides, Gilroy, both of Calif.

[73] Assignee: The United States of America as Represented by the Administrator of the National Aeronautics and Space Administration, Washington, D.C.

[21] Appl. No.: 516,842

[22] Filed: Aug. 18, 1995

[51] Int. Cl.⁶ ........................................... B31B 1/60
[52] U.S. Cl. ..................... 156/60; 156/91; 156/325
[58] Field of Search ........................ 156/60, 91, 325

[56] References Cited

U.S. PATENT DOCUMENTS

| | | |
|---|---|---|
| 5,038,693 | 8/1991 | Kourtides et al. . |
| 5,277,959 | 1/1994 | Kourtides et al. . |

OTHER PUBLICATIONS

Mui et al, "Developement of a Protective Ceramic Coating for ECT." Ceramic Engineering & Science Proceedings, vol.6, No.7–8 pp. 793–805 Jul.–Aug.1985.

Huisenfelt, "Fabrication of Composite Flexible Insulation Blankets" Contract Report by ILC Space Systems May 31, 1992.

*Primary Examiner*—Christopher Raimund
*Attorney, Agent, or Firm*—Kenneth L. Warsh; Guy Miller

[57] ABSTRACT

A method is provided for closing out the edges of a flexible ceramic insulation member including inner and outer mold line covering layers. A rigid, segmented, ceramic frame is placed around the edges of the insulation member and exposed edges of the inner and outer mold line covering layers are affixed to the ceramic frame. In one embodiment wherein the covering layers comprise fabrics, the outer fabric is bonded to the top surface and to a grooved portion of the side surface of the frame. In another embodiment wherein the outer cover layer comprises a metallic foil, clips on the edges of the frame are used to engage foil extensions. The ceramic frame is coated with a high emittance densifier coating.

19 Claims, 3 Drawing Sheets

HYBRID FLEXIBLE AND RIGID CERAMIC INSULATION

ORIGIN OF THE INVENTION

The invention described herein was made in the performance of work under a NASA contract and is subject to Public Law 95-517 (35 U.S.C. 100 ET SEQ.) The contractor has not elected to retain title to the invention.

BACKGROUND OF THE INVENTION a. Technical Field of the Invention

The present invention relates to a method and assembly for closing out or finishing off the edges of silica fibrous insulations such as are used on the exterior surfaces of aerospace vehicles.

b. Description of the Prior Art

Currently existing silica fibrous insulations of the type referred to above include those known as Advanced Flexible Reusable Surface Insulation (AFRSI) described, inter alia, in Ceramic Eng. Sci. Proc. 6:793 (1985), as well as Tailorable Advanced Blanket Insulation (TABI) and Composite Flexible Blanket Insulation (CFBI), described, inter alia, in U.S. Pat. No. 5,277,959 to Kourtides et al and U.S. Pat. No. 5,038,693 to Kourtides et al, which also describe AFRSI. Reference is made to these patents for more complete description of such insulations. These insulations are presently closed out on the edges by wrapping the outer mold line (OML) fabric around the edges of the blanket and onto the inner mold line (IML) fabric and then either sewing the outer fabric to the inner fabric or bonding two together using a flexible adhesive such as RTV. This prior art process is described in detail in the report "Fabrication of Insulation Blankets," NASA Contract NAS-13122 Final Report, May 12, 1992, and reference is made to that report for a more complete description of the process.

SUMMARY OF THE INVENTION

According to the present invention, a method for closing out the edges of a silica fibrous insulation blanket is provided which is a substantial improvement over the prior art method described above. Among other advantages, the method of the invention provides better edge definition of the blanket and reduced heat flow to the bottom of the blanket when exposed to an aeroconvective environment. The reasons why this is so will become evident from the discussion below.

Generally speaking, in accordance with the invention, the method provided is used for closing out, i.e., enclosing, the edges of a flexible ceramic insulation member including inner and outer mold line covering layers, and the method comprises the steps of: providing a rigid, segmented, ceramic frame around the edges of the insulation member; and affixing exposed edges of the inner and outer mold line covering layers of the insulation member to the rigid ceramic frame. Preferably, the method further comprises coating the ceramic frame with a high emittance densifier coating, and, advantageously, this coating includes colloidal silica.

In a first preferred embodiment, the outer and inner mold line covering layers of the insulation member comprises outer and inner mold line fabrics and the affixing step comprises bonding the outer mold line fabric to the top surface and a portion of the outer side surface of the frame and bonding the inner mold line fabric to the bottom surface of the frame.

In this embodiment, the method preferably further comprises producing a transverse groove in the side surface of the frame along the upper edge thereof, the outer mold line fabric being received in and bonded to the groove. Advantageously, the groove is coated with an adhesive prior to the receipt of the outer mold line fabric therein. In a preferred implementation, the adhesive comprises an alumina adhesive and the method further comprises pressing the outer mold line fabric into the groove to ensure intimate contact with the alumina adhesive and thereafter drying the adhesive at 150° C. for four hours. The insulation member preferably comprises a silica fibrous insulation selected from the group consisting of AFRSI, TABI and CFBI.

In accordance with a second preferred embodiment, the insulation member comprises a metallic ceramic hybrid insulation including outer mold line foil extensions and the affixing step comprises clipping the foil extensions to the segmented ceramic frame using a plurality of clips secured to the frame.

In this embodiment as in the first, the insulation member comprises an inner mold line fabric, and the affixing step, similarly to this first embodiment, comprises bonding the exposed edge of the inner mold line fabric to the bottom surface of the frame. In both embodiments, this bonding step preferably comprises coating the exposed inner mold line fabric edges with a flexible adhesive, coating the bottom surface of the frame with a flexible adhesive and joining the coated fabric to the coated surface under pressure. Advantageously, the flexible adhesives comprise RTV adhesives, the pressure is approximately 3 psi and the method further comprises curing the RTV adhesives for approximately 24 hours.

Preferably, the clips used in the second embodiment each include an upper clip portion which, in use, overlies the upper surface of the frame and produces a tight friction seal with a corresponding foil extension against the upper surface. In a preferred implementation of this method, the outer side surfaces of the frame each include a transverse clip groove therein, and the clips each further includes an intermediate clip portion which extends from the upper clip portion along part of the outer side surface of the frame and terminates in a lower clip portion received in the clip groove. Preferably, the method further comprises bonding the lower clip portion in the clip groove. Advantageously, the lower clip portion is bonded in the clip groove using an alumina ceramic adhesive.

As stated above, the invention represents a substantial improvement over the prior art methods described hereinbefore particularly in terms of edge definition and reduced heat flow to the bottom of the insulation blanket. These advantages are a product of the use of the rigid ceramic frame on the edge of the blankets and the discontinuity of the OML ceramic fabric at the edge of the blanket which exposes the high emittance surface of the coated frame.

Other features and advantages of the invention will be set forth in, or apparent from, the following detailed description of preferred embodiments of the invention.

DESCRIPTION OF THE PREFERRED EMBODIMENTS

Figure 1:
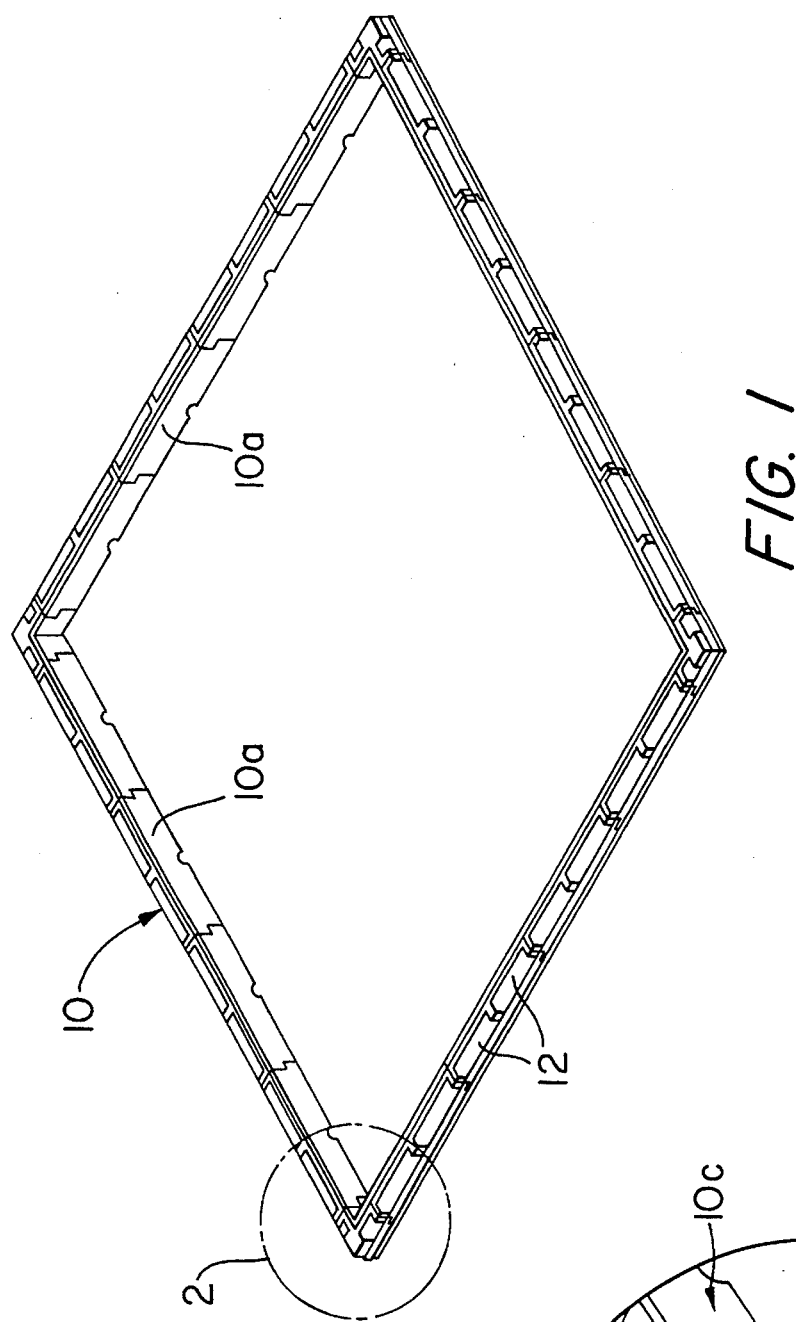
FIG. 1 is a perspective view of a frame used in a first embodiment of the method of the invention.
Figure 2:
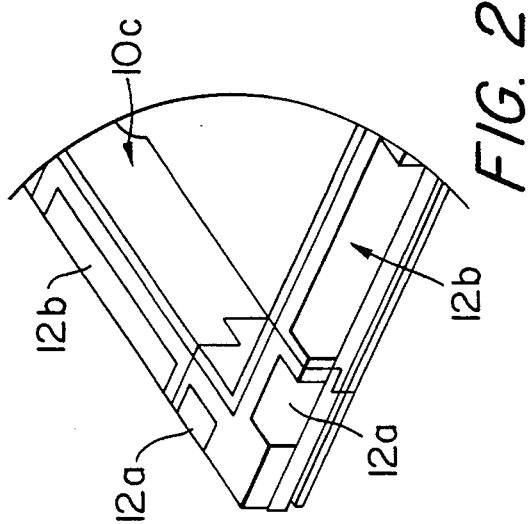
FIG. 2 is a detail of a corner of FIG. 1.

Referring to FIG. 1, there is shown a ceramic frame 10 used to form an enclosure in accordance with the present invention and adapted for use with insulations having a metallic surface such as the Durable Advance Flexible Reusable Surface Insulation described in [ARC 12081-1]. The frame 10 is comprised of a plurality of segments that are joined together to form a frame of the desired dimensions, as determined by the size and shape of the insulation blanket about which the frame is filled. As illustrated in FIG. 1, and as is also shown in FIG. 2, the frame includes a plurality of inwardly extending clips 12 arranged around the periphery thereof. Smaller clips (e.g., 0.5 inch and 0.8 inch clips in a specific, non-limiting embodiment) are provided at the corners while larger clips (e.g. 2.5 inch clips) are provided along the sides of frame 10. As illustrated, the innermost edges of clips 12 are spaced from the interior closeout surfaces, indicated at 12a.

Figure 4:
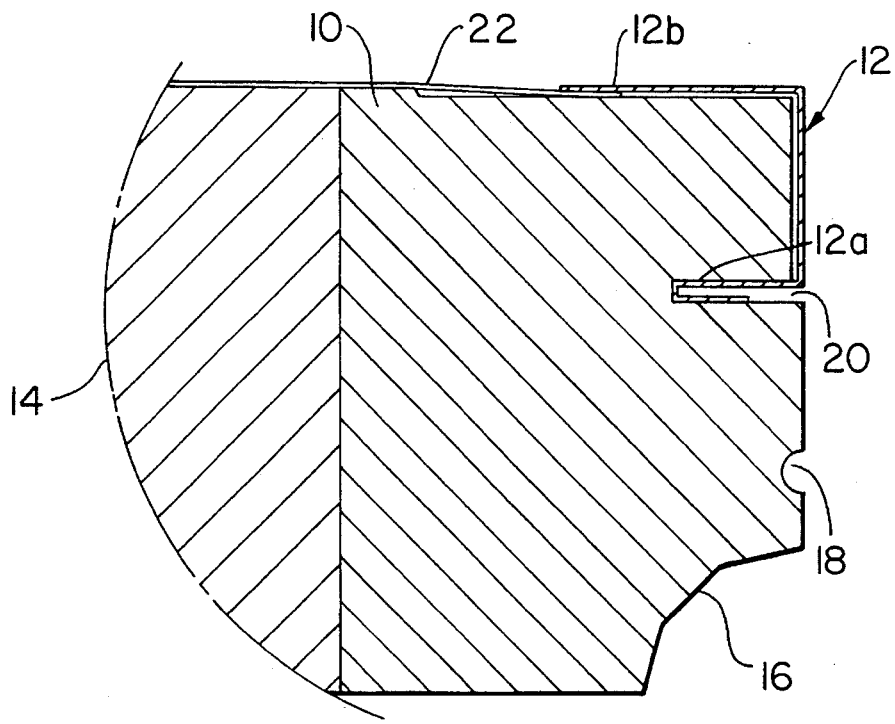
FIG. 4 is a cross sectional view, drawn to an enlarged scale, of the area of FIG. 3 shown in the large circle.
Figure 3:
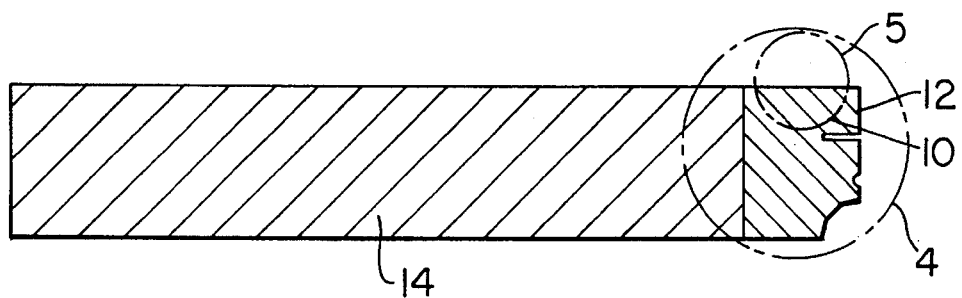
FIG. 3 is a cross sectional view of a blanket insulation member secured to the frame of FIG. 1.
Figure 5:
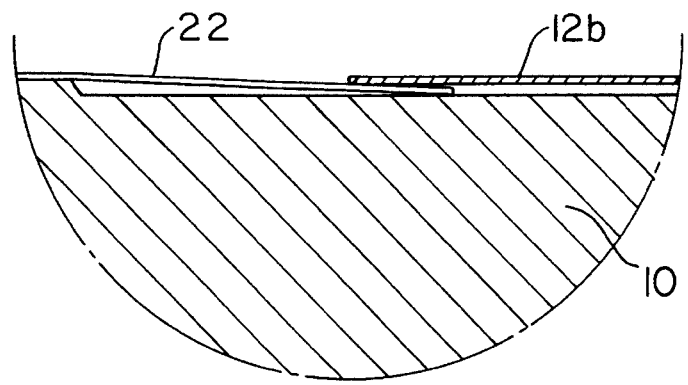
FIG. 5 is a cross sectional view, drawn to a further enlarged scale, of the area of FIG. 3 shown in the smaller circle.

The nature of the clips 12 and the geometry of the frame 10 can better be appreciated from FIGS. 3 to 5. FIG. 3 is a cross sectional view of a portion of an insulation blanket 14 with a frame 10 affixed to the edge thereof to provide closeout while FIGS. 4 and 5 show, to scales of increasing size, details of the areas indicated, respectively, by the large and small circles in FIG. 3. As shown in FIG. 3, the closeout segment of frame 10 illustrated therein includes a lower N2 purge channel 16, a seal groove 18 and a clip groove 20 in which a lower U-shaped inwardly extending portion 12a of clip 12 is received. Clip 12 is generally S-shaped with an upper leg 12a extending inwardly over an upper, slightly recessed portion 22 of closeout frame 10.

According to the method of this embodiment of the invention, the frame 10 is initially coated with a protective ceramic coating such as that described in U.S. Pat. No. 5,296,288 and in a preferred embodiment, with a coating having the formulation described in the following reference: [D. A. Koutrides]. However, in general, any ceramic coating including colloidal silica or the like present therein can be used.

The purpose of the ceramic coating is twofold. First, the coating is used to densify the surface of the frame 10 through the use of the colloidal silica or the equivalent present in the coating. This densification process promotes the adhesion of the adhesives that are used to bond the insulation blanket 14 to the frame 10 as described below. Second, the coating increases the emittance of the frame 10 at the exposed exterior edges of the frame segments and also in cases where the insulation blanket 14 is terminated with no adjacent blanket or frame on the vehicle. For the example discussed above, the ceramic coating is dried at 500° C. for four hours to enhance densification of the frame surface.

The clips 12 described above are fabricated from any alloy compatible with the metallic surface of the insulation blanket 14. As is best seen in FIG. 5, a friction seal is provided between an edge portion of upper leg 12b of clip 12 and an outer mold line foil 22 which extends outwardly from insulation blanket 14.

Prior to positioning the clips 12, the insulation blanket 14 is prepared by removing insulation around the perimeter of the blanket 14 so as to expose the metal and fabric edges of the blanket. Next, the bottom surface of frame 10 is coated with a suitable flexible adhesive such as RTV and is placed on top of the precoated fabric edges of the inner mold line fabric of insulation blanket 14 using a pressure of approximately 3 psi. A cure period of 24 hours is preferably provided so as to permit the RTV to cure.

The completed insulation has foil extensions of the outer mold line foil 22 as described above and shown in FIGS. 4 and 5. The frame segments of frame 10 are placed around the perimeter of the insulation blanket 14 under the extended foil 22. The clips 12 are positioned so as to create a tight friction seal with the foil 22 and to prevent the top portion of frame 10 from separating from the insulation.

When the clips 12 are in place, a suitable adhesive such as an alumina ceramic adhesive is placed inside of clip groove 20 of the segment of frame 10 holding the clip 12 so as to secure the clip 12 in place. The configuration of FIGS. 1 to 5 permits thermal expansion of the outer mold line foil 22 such as occurs when the associated vehicle is exposed to high temperature conditions upon reentry.

Figure 6:
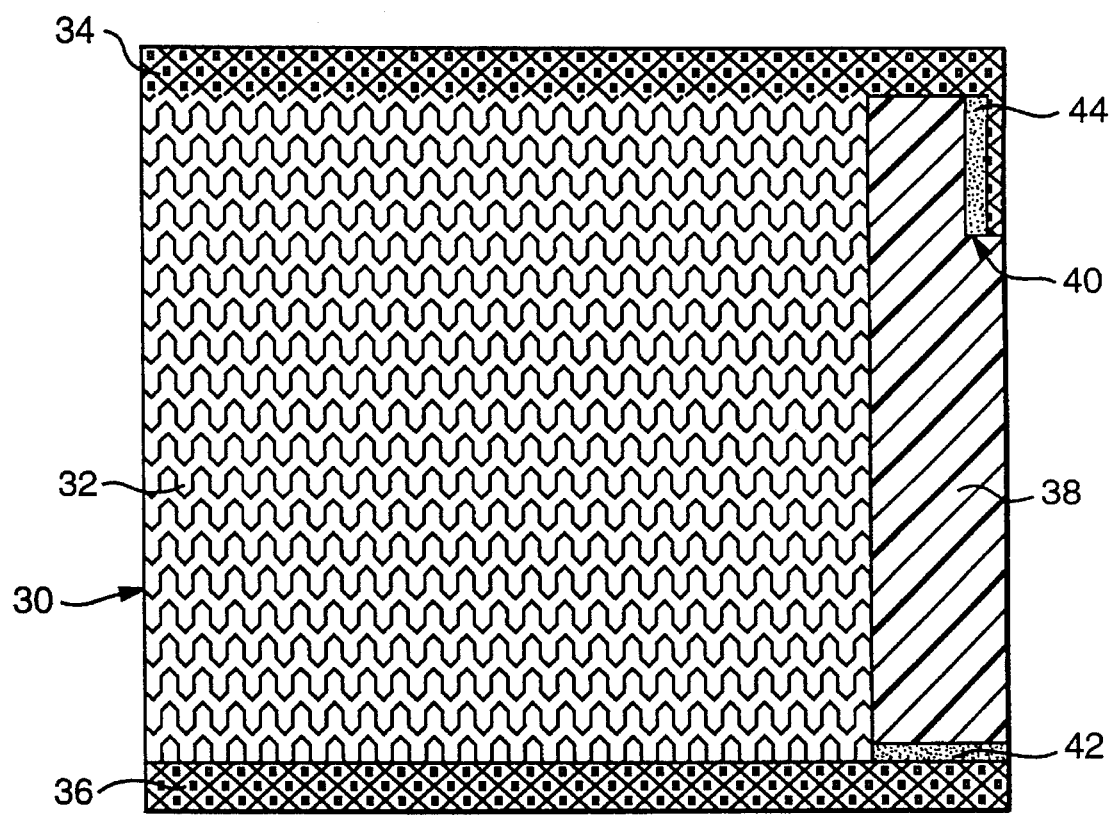
FIG. 6 is a schematical cross sectional view of a close out assembly constructed in accordance with a second embodiment of the method of the invention.

Referring to FIG. 6, there is shown a portion of a ceramic blanket insulation member 30 which is closed out using a method in accordance with a second preferred embodiment of the invention. Member 30 includes blanket insulation 32 and outer mold line fabric 34 and inner mold line fabric 36. The ceramic blanket insulation member is preferably of a ceramic blanket insulation of the type mentioned above, e.g., AFRSI, TABI, or CFBI, and described in the aforementioned U.S. Pat. Nos. 4,277,959 and 5,038,693.

In accordance with the method of this embodiment, a segmented ceramic frame is employed which is similar to that shown in FIG. 1 but which, for example, omits the clips, and a corresponding frame segment is indicated at 38 in FIG. 6. The frame sections or segments (similarly to those of FIG. 1) are preferably fabricated from Fibrous Refectory Composite Insulation-20 tiles such as those described in U.S. Pat. No. 4,093,771, to Goldstein et al. As shown in FIG. 6, the tile (frame) segment 38 is machined at the upper outer corner thereof as viewed in FIG. 6 to provide a transverse notch or recess 40 therein. In a specific, non-limiting example, segment 38 is ½ inch thick and has a height determined by the thickness of blanket 32, and notch 40 is machined ⅜ inch down from the top to a depth of 0.030 inches. It will be appreciated that the geometrical configuration of the frame segments is not limited to that shown in FIG. 6 (or in FIG. 1) and can vary depending, e.g., on the shape of the perimeter of the flexible insulation and the thickness thereof.

After machining, the frame segments or components 38 are coated with a protective ceramic coating such as that described above for the purposes previously discussed.

To prepare the insulation member 30, the blanket insulation 32 is removed around the perimeter or periphery of the member 30 so as to expose the fabric edges of the OML fabric 34 and the IML fabric 36. In a specific non-limiting example, approximately 1 inch of the insulation is removed.

After the fabric edges are exposed, the edges of the IML fabric are coated with a suitable adhesive such as RTV 560.

The bottom side of the frame segments corresponding to segment 38 are also coated with a suitable adhesive such as an RTV adhesive and are placed on the top of the precoated fabric edges of the IML fabric 38 using pressure. The RTV adhesive is indicated at 42 in FIG. 6. As set forth in the description of the first embodiment, a pressure of approximately 3 psi is used and the RTV is allowed to cure for 24 hours.

The top side edge of the tile frame segment 38 is coated with a further adhesive and the OML fabric 34 is pressed against this edge of tile segment 38 to ensure intimate contact with the adhesive. This is also shown in FIG. 6 wherein the adhesive is indicated at 44. In a preferred embodiment, the adhesive is an alumina adhesive and in a specific non-limiting example is a Contronics 989 alumina adhesive applied to a depth of 0.010 inch. The adhesive 44 and associated blanket are dried at 150° C. for 4 hours.

As a final step, any extra exposed OML or IML fabric which extends beyond frame segment 38 is trimmed down close to the segment to ensure a uniform edge at the OML and IML fabric edges.

It will be appreciated that because the frame is made up of a plurality of segments or sections generally as shown in FIG. 1, the flexibility of the blanket member 30 is maintained.

The invention is useful in providing a thermal protection system for specific heating environments which contain conductive, convective and radiative heating components. Blanket insulation made in accordance with the method of the invention is particularly adapted for use on the exterior surfaces of aerospace vehicles such as the proposed Reusable Launch Vehicle (RLV) to provide thermal protection for the vehicle during atmospheric reentry.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A method for sealing the edges of a flexible ceramic insulation member, said insulation member comprising inner and outer covering layers and an intermediate insulation layer wherein the covering layers extend beyond the edges of the insulation layer, said method comprising the steps of:

providing a rigid, segmented, ceramic frame having top, bottom and outer edge surfaces;

positioning the frame around the edges of the insulation layer such that the portion of the outer covering layer which extends beyond the insulation layer overlaps the top surface of the frame and the portion of the inner covering layer which extends beyond the insulation layer overlaps the bottom surface of the frame; and affixing the portions of the covering layers of the insulation member which overlap the frame to the rigid ceramic frame.

2. The method as claimed in claim 1 further comprising coating said ceramic frame with a high emittance densifier coating.

3. The method as claimed in claim 2 wherein said coating includes colloidal silica.

4. The method as claimed in claim 1 wherein said inner covering layer comprises a fabric, and wherein the affixing step comprises bonding the portion of the fabric which extends beyond the edges of the insulation layer to the bottom surface of the frame.

5. The method as claimed in claim 4 wherein said bonding step comprises coating the portion of the fabric which extends beyond the edges of the insulation layer with a flexible adhesive, coating the bottom surface of the frame with a flexible adhesive and joining the coated fabric portion to the coated frame surface under pressure.

6. The method as claimed in claim 5 wherein said flexible adhesive comprises an RTV adhesive, wherein said pressure is approximately 3 psi and wherein said method further comprises curing the RTV adhesive for approximately 24 hours.

7. The method as claimed in claim 1 wherein said outer and inner covering layers comprise outer and inner fabrics respectively and wherein said affixing step comprises bonding said outer fabric to said top surface and a portion of said outer side surface of said frame and bonding said inner fabric to said bottom surface of said frame.

8. The method as claimed in claim 7 further comprising producing a groove in said outer side surface parallel to the edge formed by the outer side surface and the top surface of the frame, said outer fabric being received in and bonded to said groove.

9. The method as claimed in claim 8 wherein said groove is coated with an adhesive prior to the receipt of said outer fabric therein.

10. The method as claimed in claim 9 wherein said adhesive comprises an alumina adhesive and said method further comprises pressing said outer fabric into said groove to endure intimate contact with said alumina adhesive and thereafter drying the adhesive at 150 ° C. for 4 hours.

11. The method as claimed in claim 7 further comprising coating said ceramic frame with a high emittance densifier coating prior to said bonding step.

12. The method as claim in claim 7 wherein said insulation member comprising a silica fibrous insulation selected from the group consisting of AFRSI, TABI and CFBI.

13. The method as claimed in claim 1 wherein said insulation member is a metallic ceramic hybrid insulation wherein the outer covering layer comprises metallic foil and said affixing step comprises clipping said foil to the frame using a plurality of clips secured to the frame.

14. The method as claimed in claim 13 wherein said clips each include an upper clip portion which overlies the top surface of the frame and produces a tight friction seal between the foil and the top surface of the frame.

15. The method as claimed in claim 14 wherein said outer side surfaces of the frame each include a groove therein, wherein said groove is parallel to the edge formed by each of the outer side surfaces and the top surface of the frame, and wherein said clips each further include a lower clip portion received in said groove.

16. The method as claimed in claim 15 wherein said method further comprises bonding said lower clip portion in said groove.

17. The method as claimed in claim 16 wherein said lower clip portion is bonded in said groove using an alumina ceramic adhesive.

18. The method as claimed in claim 15 further comprising coating said ceramic frame with a high emittance densifier coating prior to clipping said insulation member to the frame.

19. The method as claimed in claim 18 wherein said inner covering layer comprises an inner fabric, and wherein the affixing step comprises bonding the inner fabric to the bottom surface of the frame.

* * * * *